(No Model.)
R. HERZ.
RAILWAY BICYCLE.
No. 536,205. Patented Mar. 26, 1895.
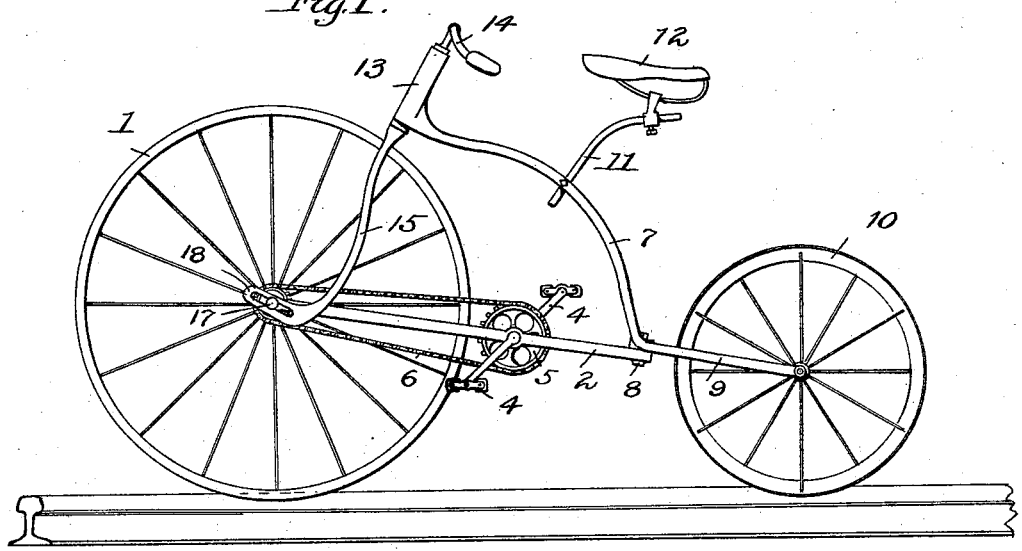
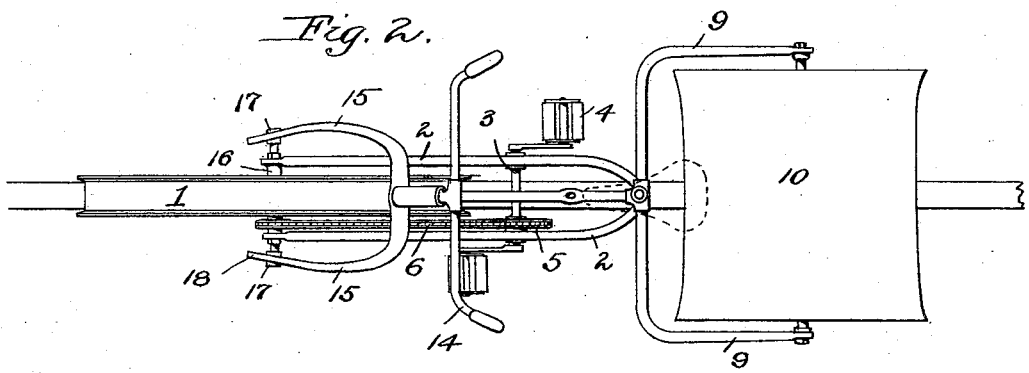
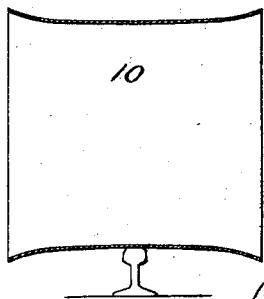

UNITED STATES PATENT OFFICE.

RAYMOND HERZ, OF PARIS, TEXAS.

RAILWAY-BICYCLE.

SPECIFICATION forming part of Letters Patent No. 536,205, dated March 26, 1895.

Application filed May 15, 1894. Serial No. 511,370. (No model.)

*To all whom it may concern:*

Be it known that I, RAYMOND HERZ, a citizen of the United States, residing at Paris, in the county of Lamar and State of Texas, have invented a new and useful Railway-Bicycle, of which the following is a specification.

My invention relates to improvements in railway velocipedes and my object is to provide a machine capable of traveling on one rail, and to only require two wheels with their connecting frames. To accomplish this object and produce a railway bicycle, I use a forward double flanged wheel to engage the rail and a following wheel or roller as I prefer to call it—following the forward wheel. In such a machine the weight and friction are materially reduced from that of the present type, thus permitting greater speed and ease in handling. Suitable frames for preserving a proper relation between the wheel and roller are described hereinafter and shown in the drawings, in which—

Figure 1 is a side elevation. Fig. 2 is a plan view, and Fig. 3 is a longitudinal section through the roller.

The forward and driving wheel 1 is held in the rigid frame 2 by suitable bearings; preferably ball; and is connected to the drive shaft 3 with its cranks and pedals 4 and gear wheel 5; by the chain 6 which passes over a gear on the hub of the driving wheel 1. This rigid frame 2 is pivoted to the main frame 7 by bearings 8 at the joining of the rear forks 9 9 which hold the rear wheel or roller 10 with its ball bearings. The main frame extends upward and forward from the bearing 8 and is adapted to hold an adjustable saddle support 11 with its saddle 12. Beyond the saddle support and over the driving wheel the end of this frame 7 is formed into a head or bearing 13 in which the handle bar 14 and fork 15 are fitted and allowed to turn.

The axle 16 of the driving wheel is necessarily secured in the frame 2 by suitable fastenings, but its ends are extended beyond these fastenings and are provided with collars 17 at their ends. Between each set of collars the axle is embraced by the slotted ends 18 of the forward fork 15, and thus forms a sliding connection.

The roller 10 forms the most important feature of my invention and I will now more particularly describe its functions. This concave roller takes the place of the other flanged wheels required by the railway velocipede, and by its use the machine can be made much lighter—even as light as the ordinary bicycle, and thus by reducing the number of bearings and weight increase the speed and provide a wheel much easier of removal from the track, necessitated by the approach of a train, or by arrival at the operator's destination. This roller allows the balancing action essential to successful riding on two wheeled vehicles, as its shape allows a lateral movement in relation to the rail, necessary to keep the center of gravity of the rider and machine over a line connecting the points of contact of the wheel and roller on the rail. As all are well aware, motion is necessary to preserve this relation with an ordinary bicycle, so my machine will not stand alone upon the rail without other support.

In order to allow the lateral movement of the roller and also to permit the wheel to ride curves without causing the flanges of the driving wheel to bind the frames are pivoted to each other as before described. To accomplish this necessarily small change of the relation of the wheel and roller the pivotal line of the head is so placed that it will not pass through the axle of the driving wheel, but falls in the rear so that the turning of the handle bar—which is rigidly secured to the forward fork—forces the driving wheel out of a parallel position of the two axles and allows the flanges to assume a parallel position to the rail, when the roller is riding on the rail, off a position midway between its sides. I prefer to form this roller of sheet metal, having its lowest concavity at a point midway between its sides, increasing in pitch as it nears the sides which gives it a tendency to ride upon the rail near its middle and also have sufficient rise near the sides to prevent it from easily slipping from the rail. However, I do not wish to limit myself to this particular form as a plain cylindrical roller may be used; and What I do claim is—

1. In a railway bicycle, the combination of a frame a wheel with double flanged tread to engage the rail, and a broad tread wheel or roller to allow transverse movement on the rail, substantially as described.

2. In a railway bicycle the combination of a wheel with double flanged tread, to engage the rail and a concave faced roller or broad tread wheel to allow transverse movement while bearing on the rail, substantially as described.

3. In a railway bicycle, the combination of a double flanged wheel and a concave, broad tread-roller or wheel to allow sufficient transverse movement; of driving mechanism connected to said wheels, or wheel and roller and a pivoted frame connecting the said wheels, or wheel and roller, substantially as described.

4. In a railway bicycle, the combination of a double flanged driving wheel, a forked frame supporting and connecting the driving mechanism and said wheel, and a broad concave tread wheel or roller mounted in a forked frame pivoted to said driving mechanism frame, substantially as described.

5. In a railway bicycle, the combination of a double flanged wheel and a broad, concave tread, wheel or roller connected by pivoted frames and a handle bar and forward fork connected to each of said frames to control their relation to each other, substantially as described.

6. In a railway bicycle, the combination of a double flanged driving wheel and its driving mechanism mounted in a frame, a broad, concave tread, wheel or roller mounted in a rear frame pivoted to said driving mechanism frame, said rear or main frame supporting the saddle for the operator and the pivotal head for the controlling bar and forward fork connected to said driving wheel, substantially as described.

7. In a railway bicycle, the combination of a double flanged tread driving wheel with extended axle ends, and its driving mechanism mounted in a frame, a broad, concave tread, wheel or roller mounted in a rear or main frame pivoted to said driving wheel frame, said rear or main frame supporting and forming a head for the controlling handle bar and forward fork, with its slotted ends engaging the extended ends of the axle of the driving wheel, substantially as described.

In testimony whereof I hereunto place my signature in the presence of two witnesses.

RAYMOND HERZ.

Witnesses:
   CHARLES HEDGES,
   CHARLES W. STETSON.